(12) United States Patent
Imsgard

(10) Patent No.: US 9,308,667 B2
(45) Date of Patent: Apr. 12, 2016

(54) METHOD FOR INCREASING THE WATER RESISTANCE OF A POROUS MATERIAL, COMPOSITIONS THEREFOR AND POROUS MATERIALS TREATED ACCORDING TO THE METHOD

(75) Inventor: Finn Imsgard, Kolding (DK)

(73) Assignee: Superwood A/S (DK)

( * ) Notice: Subject to any disclaimer, the term of this patent is extended or adjusted under 35 U.S.C. 154(b) by 368 days.

(21) Appl. No.: 13/513,029

(22) PCT Filed: Oct. 15, 2010

(86) PCT No.: PCT/DK2010/000138
§ 371 (c)(1),
(2), (4) Date: May 31, 2012

(87) PCT Pub. No.: WO2011/066830
PCT Pub. Date: Jun. 9, 2011

(65) Prior Publication Data
US 2012/0237760 A1 Sep. 20, 2012

(30) Foreign Application Priority Data
Dec. 3, 2009 (DK) .............................. 2009 70241

(51) Int. Cl.
| | |
|---|---|
| *B27K 3/15* | (2006.01) |
| *C08H 8/00* | (2010.01) |
| *B27K 3/08* | (2006.01) |
| *C08L 53/00* | (2006.01) |
| *C08L 97/02* | (2006.01) |
| *C08G 81/00* | (2006.01) |

(52) U.S. Cl.
CPC . *B27K 3/15* (2013.01); *B27K 3/086* (2013.01); *C08G 81/00* (2013.01); *C08H 8/00* (2013.01); *C08L 53/00* (2013.01); *C08L 97/02* (2013.01); *B27K 2240/70* (2013.01); *C08L 2666/24* (2013.01); *Y02P 20/544* (2015.11); *Y10T 428/249991* (2015.04)

(58) Field of Classification Search
CPC ...................................................... B27K 3/086
See application file for complete search history.

(56) References Cited

U.S. PATENT DOCUMENTS

| | | | |
|---|---|---|---|
| 5,169,687 A * | 12/1992 | Sunol | 427/297 |
| 6,165,559 A | 12/2000 | McClain et al. | |
| 6,517,907 B1 * | 2/2003 | Henriksen | 427/440 |
| 2002/0168473 A1 | 11/2002 | Ottersbach et al. | |

(Continued)

FOREIGN PATENT DOCUMENTS

| | | |
|---|---|---|
| DE | 42 02 320 | 8/1993 |
| DE | 100 43 316 | 3/2002 |

(Continued)

OTHER PUBLICATIONS

Vogt et al, Chem. Mater., 17, pp. 1398-1408, 2005.*

(Continued)

*Primary Examiner* — Erma Cameron
(74) *Attorney, Agent, or Firm* — Merek, Blackmon & Voorhees, LLC

(57) ABSTRACT

The present invention relates to a method for increasing the water resistance of a porous material, in particular wood, in which method a block-polymer comprising at least one hydrophobic block and at least one hydrophilic block, is dissolved in a fluid and applied to the material under supercritical conditions.

18 Claims, 12 Drawing Sheets sc-CO2 wood preservation technologies - traditional impregnation vs wood modification

(56) References Cited

U.S. PATENT DOCUMENTS

| | | |
|---|---|---|
| 2005/0208317 A1* | 9/2005 | Henriksen et al. .......... 428/537.1 |
| 2007/0006771 A1 | 1/2007 | Matsumura et al. |
| 2007/0264175 A1* | 11/2007 | Iversen et al. ................. 422/235 |
| 2008/0069852 A1* | 3/2008 | Shimp et al. .................. 424/423 |
| 2008/0233323 A1 | 9/2008 | Cheng et al. |

FOREIGN PATENT DOCUMENTS

| | | |
|---|---|---|
| WO | WO 90/02612 | 3/1990 |
| WO | WO 00/27604 | 5/2000 |
| WO | WO 03/095165 | 11/2003 |
| WO | WO 2007/126327 | 11/2007 |

OTHER PUBLICATIONS

Pai et al, Science, 303, pp. 507-510, Jan. 23, 2004.*

Anderson, Matthew et al.; "The Effects of Supercritical CO2 on the Bending Properties of Four Refractory Wood Species", Forest Products Journal, vol. 50, No. 11/12, pp. 85-93, Nov.-Dec. 2000.

* cited by examiner sc-CO2 treatment - effect of polymer structure using < 10 kg/m3 retention ○ EO-block  ○ PO-block  ● Butyl terminated

| Mw | Type | Structure of polymer | % water absorption in wood (80 min) |
|---|---|---|---|
| 1000 | Block polymer |  | 13-14 |
| 1000 | Random polymer |  | 24-25 |
| 900 | Homo polymer |  | 27-28 | sc-CO2 wood preservation technologies - traditional impregnation vs wood modification Wood modification
- reaction/entrapment with/in cellulose/lignin within wood cell walls

OR

Cross cut of wood cell wall

Wood impregnation
- absorption/entrapment to external/internal wood surfaces

– – – Monomers  $\ll 500$

——— Polymers  $> 500$

Mw:

METHOD FOR INCREASING THE WATER RESISTANCE OF A POROUS MATERIAL, COMPOSITIONS THEREFOR AND POROUS MATERIALS TREATED ACCORDING TO THE METHOD

CROSS-REFERENCE TO RELATED APPLICATION

The present application claims the priority under 35 U.S.C. 119 of Danish Patent Application No. PA 2009 70241, filed on Dec. 3, 2009, which is hereby incorporated herein by reference in its entirety.

The present invention relates to a method for increasing the water resistance of a porous material, in particular wood, in which method a block-polymer comprising at least one hydrophobic block and at least one hydrophilic block is dissolved in a fluid and impregnated in the material under supercritical conditions.

Fluids under supercritical conditions have been used as a preferred carrier of anti-fungi and anti-microbial compounds for impregnating wood and also for extracting undesired substances. Such methods are described generally in the art, and specifically in WO 00/27601 and WO 03/095165, in which improved treatments of porous materials with supercritical fluids are claimed and described.

Supercritical carbon dioxide (sc-$CO_2$) is capable of dissolving certain organic fungicides and is therefore presently used as a green solvent for the preservation of wood. Supercritical carbon dioxide has gas like viscosity as well as low surface tension and is therefore particularly efficient in penetrating a porous material.

In addition to preservation of wood it is desirable to improve wood and other wood like materials such as chipboards, carbon, paper and other materials having a porous structure, in respect of water resistance and durability. These materials are very susceptible to water absorption; and particularly wood for outdoor use should be able to last for many years.

Therefore, it is important to find ways of increasing the durability of wood and other materials that are frequently subjected to wet or humid conditions. One way of increasing the durability of, e.g. wood, is by increasing the water resistance. Traditional impregnated wood confers some degree of durability and/or water resistance partly due to the presence of anti-fungal and/or anti-microbial agents, which act upon the fungi and microbes that thrive in a wet environment, and the impregnation as such can confer water repellant characteristics to the material.

Also, different waxes, oils and similar compounds have been used alone and in addition to impregnation in the field to increase the water resistance of porous materials and, in particular, wood but also e.g. leather. These materials seem to solve the problem with respect to water resistance.

The problem with using these types of compounds and the traditional impregnation, conferring the water resistance, is that the wood becomes water repellant, in addition to being water resistant, and is thus very difficult and in many cases impossible to treat with further means such as paint, coating, sealing, protective layers etc, which today are often water based.

Thus, the object of the present invention is to provide an improved method to improve the water resistance of a porous material and further for overcoming one or more of the above stated problems.

SUMMARY OF THE INVENTION

This object is solved by the first aspect of the invention directed at a method in which in a first step a1) at least one polymer is applied to a porous material; or a2) at least one polymer is mixed with a fluid; and in a second step b) the porous material is treated with a fluid, optionally the fluid comprising the polymer, under supercritical conditions; and wherein the at least one polymer is a block-polymer comprising at least one hydrophobic block and at least one hydrophilic block.

It was surprisingly found that the method according to the invention results in a product which is more resistant to water, e.g. as illustrated with a reduced weight gain when immersed into water, even when compared to products treated with a random polymer or a homopolymer. Moreover, it was found that in addition to the improved water resistance, the products treated according to the present invention are not water repellent. This effect of not being a water repellant is of great importance when the product is to be further processed e.g. by painting, dying, gluing etc. using water based compositions.

Another important aspect when measuring water resistance is the stability of the treatment. The stability can be measured by performing a number of immersion cycles in which e.g. wood blocks are dried to regain the starting weight after each immersion in water. A normal course will reveal that the water resistance will decrease for each soaking cycle. It surprisingly turned out that when performing this stability test the treatment according to the present invention showed a rather flat curve in respect of the decrease and in preferred embodiments even showed an increased water resistance over time, i.e. comprised less moisture after several soakings. This means that porous materials treated according to the present invention will have a longer persistence as compared to materials treated by prior art methods for increasing water resistance. Thus, by the present invention is provided a method which makes treated products both water resistant and more durable and at the same time non-repellant.

In a presently preferred embodiment the block-polymer has a structure selected from:

a triblock copolymer of the general formula (i)

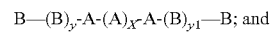

a grafted copolymer of the general formula (ii)

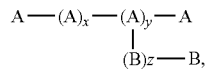

wherein A is a hydrophobic block, B is a hydrophilic block and, x, y, $y_1$ and z independently are an integer, preferably x is 0-30, more preferred 3-30, y is 0-20, $y_1$ is 0-20 and z is 0-20, with the proviso that x, y, $y_1$ and z are not simultaneously 0.

Preferably x+y+($y_1$ or z)≤50. When the polymer length increases solubility decreases and viscosity increases which make the handling more difficult. In addition it is believed that larger polymers will not be able to be trapped within the porous structure, such as within the wood fibres, but are instead deposited between the elements of the porous structure. Entrapment is believed to withhold the polymers within the structure more effectively. Therefore, such polymers, where x+y+($y_1$ or z)≤50, are particular preferred for the non-reactive polymers that are not retained in the material by covalent bonds In another particular embodiment the preferred block-polymer is a polypropylene ether polymer, siloxane-containing polymer or a fluor-containing polymer. The fluor-containing polymers are very effective but also relatively expensive, while the siloxane polymers show almost the same effectiveness but are less costly and are thus from an economical perspective preferred.

The polymers are in the context of the present invention divided in reactive and non-reactive polymers. In this context a reactive polymer is a polymer comprising a functional group capable of forming a stable covalent bond with a hydroxyl group. Similarly, a non-reactive polymer is not capable of forming a stable covalent bond with a hydroxyl-group.

Particular preferred polymers comprise a functional group capable of reacting with hydroxyl groups often present in the porous material. In the context of the present invention these polymers are as mentioned above denoted "reactive polymers". Such functional groups may be epoxides, esters, carboxylates, anhydrides or other radicals which are able to react with hydroxyl groups of the porous material in the presence of water and optionally a catalyst and form a stable covalent bond.

The functional group may be either terminal, i.e. present in the B-block of polymers having the general formula (i) or non-terminal, that is, present in the B-block of polymers having the general formula (ii).

When the polymer comprises a functional group that is able to form a bond with the hydroxyl groups, the water resistance will be more durable as repeated exposures to water will not extract the polymers out of the structure. It was even seen that the weight gain after several immersion in water was reduced over time, which indicates that the repeated exposure to water may facilitate the formation of covalent bonds between the polymer and the porous material.

Thus, this embodiment is particularly preferred when the material to be treated is meant for a long service life such as 20, 25 or 30 years. This is particularly important in the construction industry where a long service life is often necessary.

In yet another embodiment the polymers, and particularly the polymers comprising a functional group capable of forming a bond with the hydroxyl groups of the porous material, are mixed with a catalyst for promoting reaction between the polymer and the porous material. The catalyst may promote ring open reactions and transesterifications.

The catalyst should be chosen so that substantially no reaction is occurring with the polymer when dissolved in the fluid phase, but primarily occurs when the polymer is deposited in the porous material to be treated. Therefore, this embodiment is particularly suitable for treatment in supercritical fluids, such as carbon dioxide, as the presence of carbon dioxide will inhibit the reaction between catalyst and polymer before being deposited within the porous matrix and the superciritcal fluid is evaporated.

By adding the catalyst the polymer will form a bond with the hydroxyls groups relatively fast, and, consequently ensure a fast retention of the polymer in the porous material and thus ensure sufficient utility of the polymer, e.g. minimize waste and reduce loading range, and prolong the effect of treating the porous material significantly.

The catalyst may be any catalyst capable of facilitating the reaction between an OH-group and a group, such as the functional group of the polymer. Thus, it may be both an acid-forming and a catalyst for reaction under basic conditions. Presently preferred catalysts are acid-forming catalysts, such as metal-esters, alkoxydes and/or chelates of for example Ti, Zr and Al and/or combinations thereof.

Zirconium compounds are less reactive than Titanium and Aluminum. Also, it is generally known in the art that chelates and esters are less reactive than alkoxydes. In addition, substituents comprising carbon chains of 3 or more carbon atoms, such as 4, 5, 6, 7 or 8 are less reactive than chains of 1 or 2 carbon atoms.

Thus, the choice of metal, functionality and chain length of the carbon chain may be combined in order to obtain the sufficient reactivity, i.e. not too fast. To exemplify, if Titanium is the metal it may be desirable to select a longer carbon chain such as comprising 4, 5 or 6 carbon atoms. Similarly it may be preferable to select an alkoxyd reactive group when the metal is zirconium.

The specific choice of catalyst may be tested on the polymer used, as the reactivity of the polymer will also affect the choice of catalyst. It is within the skill of the art to select an optimal catalyst based on the guidance given herein and routine experimentation.

Presently preferred catalysts are mixtures of alkoxide and ester complexes, such as those from the Tyzor® product line available from DuPont Chemical Solutions Enterprise, preferably selected from compounds having the formula (iii):

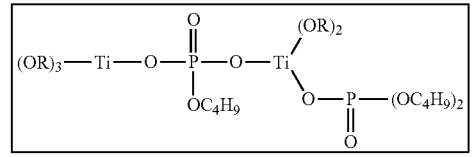

where OR is the leaving group, and the carbon chain comprises four carbon atoms. Thus, a balance between the length of the carbon chain and the metal is provided as guided above.

Other catalysts available capable of enhancing the reaction between the polymers used and the porous material are also contemplated.

The porous material is in a particular embodiment a conifer wood species, in particular pine, spruce or larch.

The treatment according to the present invention renders, in that particular embodiment, non-expensive wood species more durable and comparable to hard wood species in respect of weather resistance. Thus, by the treatment these less expensive wood species and pieces of the wood will resemble the hard wood species and pieces in respect of water resistance.

In yet another embodiment at least two different block-polymers according to the invention are used in the method. It was surprisingly found that a synergistic effect is obtained in respect of water resistance when mixing two different arbitrarily chosen block-polymers of the invention. Without the wish to be bound by any theory it is believed that the improved effect is obtained because the different block-polymers settle differently in the wood matrix, and are consequently distributed more evenly in the wood matrix.

Thus, in a second aspect the present invention also provides a composition comprising at least two block-polymers wherein the block polymers comprise at least one hydrophobic block and at least one hydrophilic block and wherein the at least two block polymers are not identical.

In still another embodiment of each aspect (i.e. the method and the composition) of the invention, the ratio (based on weight) between the two different block-polymers is 3:1 to 1:3 and more specifically 1:1. It was found that when mixing the block-polymers at a ratio of 1:1 the best effect is obtained, irrespective of the specific block-polymers that are mixed, as compared to other ratios or one block-polymer used alone. It should be emphasized that these effects are observed using the same total volume of block-polymer.

Even better results were obtained when mixing a perfluoropolyether modified terminally with alkylamide or a polyether block-polymer with a central polypropylene oxide block modified terminally with a polyethylene oxide block or a polyether modified siloxane block-polymer at a ratio of approximately 1:1. Tests show that the fluor-containing block-polymers and siloxane containing block-polymers alone are better than any other block-polymer alone. However, as some of these types of block-polymers are very expensive, the surprising finding that mixing this type with an otherwise less effective block-polymer improves the water resistance, is not only surprising, but also of great economic value. And it is even more surprising that a ratio of 1:1 gives an even better result than when adding comparatively more of either of the siloxane- and fluor-containing block-polymers than the inferior block-polymer.

Thus, mixing of block-polymers has several advantages. First of all a synergistic water resisting effect is obtained, secondly the treated product is not water repellant. Moreover, the block-polymers when mixed may even be less costly than using one type in addition to being more effective for the intended purpose.

In another embodiment the at least one of the two different polymers is selected from the reactive polymers and a catalyst while the at least second is a non-reactive polymer. This will result in the same effect as obtained with the reactive polymers and catalyst alone but it is possible at a reduced cost as the second non-reactive polymer could be chosen among the less expensive polymers such as polypropylene ethers (number 5 in table 2). Thus the same effect is obtained at less cost. Only the durability may be slightly compromised. However, if the material treated is typically used for no more than 5 or 15 years, typically 10-15 years, this solution may be preferred. It is contemplated that the method of the present invention can be combined with existing methods for impregnating, extraction etc. of wood with a supercritical fluid.

Thus, in a particular embodiment the method of the present invention is applied in a method in which a porous material, such as a resin-containing wood substrate, is treated using a fluid in supercritical state as delivering or extractive solvent medium, which fluid in supercritical state is soluble in the resin present in the wood substrate and wherein the supercritical fluid comprises the block-polymer of the present invention, comprising the steps of
  i) introducing the wood substrate into a pressure tight treatment chamber,
  ii) introducing a stream comprising said fluid into the chamber and adjusting the pressure and temperature therein to ensure the fluid being present in supercritical state,
  iii) maintaining contact between the wood substrate and the fluid in supercritical state for a time period,
  iv) reducing the pressure and/or the temperature, and
  v) withdrawing the treated wood substrate from the chamber,
wherein the releasing step (iv) comprises the features:
  a) releasing the pressure at a controlled rate
  b) controlling the temperature at optimal level
  c) allowing sufficient time for polymer absorption In yet another embodiment the porous material is a wood substrate having a length above the critical length and is a type of wood which is susceptible to damage and the wood substrate is treated by a method in which the fluid in its supercritical state comprising the block-polymer of the present invention is kept in non-liquid state at all times during treatment. In yet an embodiment this method may be performed by applying the method steps a) to c) as set out above.

In yet another aspect of the invention is provided a porous material treated according to the present invention.

This material will have the advantages as set out above. In a specific embodiment the material is defined by a weight gain in percent of the porous material after immersion for 80 minutes in water at 20° C. of 20% or less. This is compared to a weight gain of 28% for an untreated specimen or a specimen treated with a homo-polymer (illustrated in FIG. 1).

BRIEF DESCRIPTION OF THE DRAWINGS

In FIG. 11a the active materials to be applied to the wood are mixed within the system, while polymer or other active materials with which the wood is to be treated are mixed before being supplied to the system in FIG. 11b.

DETAILED DESCRIPTION

Figure 1:
FIG. 1 is a summarized illustration of the water absorption effect after treatment with a block-polymer according to the invention, a random mixture of polymers and a homo-polymer.
Figure 1:
Figure 1:

The invention will now be described in greater details. Each specific embodiment and variation of features applies equally to each aspect of the invention unless specifically stated otherwise.

In the following detailed description, the porous material is primarily referred to as wood, however, the present invention should not be limited to wood alone, but is applicable in connection with any porous material and in particular to any porous material comprising free hydroxy groups.

In the context of the present invention the term hydrophilic and hydrophobic should have the traditional meaning.

Throughout the description and claims all ratios are wight unless otherwise stated.

In the context of the present invention the term block-polymer should have the meaning as according to IUPAC, i.e. polymer composed of block macromolecules, which again are composed of blocks in linear sequence. The term triblock copolymer contemplates a block polymer comprising three blocks, and in a preferred more specific embodiment a triblock having the general structure (i):

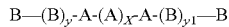

where A is a hydrophobic block, B is a hydrophilic block and, x, y and $y_1$ independently are 0 or an integer, with the proviso that they are not simultaneously 0 and x, y and $y_1$ are also as specified in the specification and claims. In the context of the present invention a graft or branched block polymer should mean a polymer having a main linear backbone with a number of branched chains. In a particular embodiment the grafted polymer is a polymer of the general formula (ii)

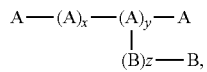

where A is a hydrophobic block, B is a hydrophilic block and, x, y and z independently are 0 or an integer and are as specified in the specification and claims.

The polymers can be polyethers where the hydrophobic building block are derived from propylene oxide [A=$CH_2$—CH($CH_3$)—O] and the hydrophilic building block is derived from ethylene oxide [B=$CH_2$—$CH_2$—O]. Polymers of this type are well known and produced among others, by BASF under the trade names Pluronic and Pluriol.

Other examples are polyether modified siloxanes. The hydrophobic block comprise dimethylsiloxane units [A=O—Si($CH_3$)$_2$] and the hydrophilic block can be made of polyethers.

The polyether block can be made of a mixture of polyethylene ethers [B=$CH_2$—$CH_2$—O] and polypropylene ethers [B=$CH_2$—CH($CH_3$)—O] or ethers made solely from either of the building blocks. This type of polymer is known as polyether modified siloxanes. Such products are produced by for example Momentive and Wacker Chemie and have many industrial applications such as dispersing, anti-foaming and wetting agents.

The hydrophobic part/segment of the block polymer can even comprise fluor based building blocks like hexafluoro propylene oxide (HFPO). Commercial products of this type are produced by Solvay S.A. under the trade name Fluorolink. In this case the hydrophobic block will comprise perfluoro polyethers [A=$CF_2$—CF($CF_3$)—O] and the hydrophilic block is composed of ethylene oxide units (B=$CH_2$—$CH_2$—O) or alkyl amides (B=R—CO—NH—).

Specific examples of monomer units for use in the present invention, and specific combinations of hydrophobic and hydrophilic monomers are given in table 1 below. The invention should however not be limited to these specific combinations alone. Other combinations of the specific hydrophilic and hydrophobic monomer units are contemplated.

TABLE 1

Polymer structure and composition.

| No | A Hydrophobic block | B Monomer unit | C Hydrophilic block | D Monomer unit |
|---|---|---|---|---|
| 1 | Polypropylene ether | —$CH_2$—CH($CH_3$)—O— | Polyethylene ether | —$CH_2$—$CH_2$—O— |
| 2 | Polypropylene ether | —$CH_2$—CH($CH_3$)—O— | Polypropylene ether | —$CH_2$—CH($CH_3$)—O— |
| 3 | Polypropylene ether | —$CH_2$—CH($CH_3$)—O— | Mixture of C1 and C2 | |
| 4 | Polypropylene ether | —$CH_2$—CH($CH_3$)—O— | Polyethylene amine | —$CH_2$—$CH_2$—NH— |
| 5 | Polypropylene ether | —$CH_2$—CH($CH_3$)—O— | Polyvinylacetate | —$CH_2$—CH(OCO$CH_3$)— |
| 6 | Polypropylene ether | —$CH_2$—CH($CH_3$)—O— | Polyvinylalkohol | —$CH_2$—CH(OH)— |
| 7 | Polypropylene ether | —$CH_2$—CH($CH_3$)—O— | Mixture of C5 and C6 | |
| 8 | Polypropylene ether | —$CH_2$—CH($CH_3$)—O— | Polyacrylate | —$CH_2$—$CH_2$—CO—R1 |
| 9 | Polypropylene ether | —$CH_2$—CH($CH_3$)—O— | Polyvinyl cyclic amide or amine | —$CH_2$—$CH_2$—R2 |
| 10 | Polyalkyl ether | —$CH_2$—CH(R3)—O— | Any of C1, C2, C3, C4, C5, C6, C7 and C8 | |
| 11 | Polylactate | —O—CH(CH3)—CO— | Any of C1, C2, C3, C4, C5, C6, C7 and C8 | |
| 12 | Polycaprolactone | —O—(CH2)5—CO— | Any of C1, C2, C3, C4, C5, C6, C7 and C8 | |
| 13 | Polyvinylalkylate | —$CH_2$—CH(OCO—R4)— | Any of C1, C2, C3, C4, C5, C6, C7 and C8 | |
| 14 | Siloxane-di-methyl | —Si($CH_3$)$_2$—O— | Any of C1, C2, C3, C4, C5, C6, C7 and C8 | |
| 15 | Siloxane-di-alkyl | —Si(R5)$_2$—O— | Any of C1, C2, C3, C4, C5, C6, C7 and C8 | |
| 16 | Siloxane-di-aryl | —Si(R6)$_2$—O— | Any of C1, C2, C3, C4, C5, C6, C7 and C8 | |
| 17 | Perfluoroethylene ether | —$CF_2$—$CF_2$—O— | Any of C1, C2, C3, C4, C5, C6, C7 and C8 | |

TABLE 1-continued

Polymer structure and composition.

| A No | Hydrophobic block | B Monomer unit | C Hydrophilic block | D Monomer unit |
|---|---|---|---|---|
| 18 | Perfluoropropylene ether | —$CF_2$—$CF(CF_3)$—O— | Any of C1, C2, C3, C4, C5, C6, C7 and C8 | |
| 19 | Mixture of A17 and A18 | | Any of C1, C2, C3, C4, C5, C6, C7 and C8 | |
| 20 | Perfluoroethylene | —$CF_2$—$CF_2$— | Any of C1, C2, C3, C4, C5, C6, C7 and C8 | |
| 21 | Poly(ethercarbonate) | —O—$CH_2CH(CH_3)$—OCO— | Any of C1 to C8 | |

The substituents R1 to R5 could be, but are not limited to the following:
R1 = OH, CH2—CH2—OH, (CH2—CH2—O)n, (CH(CH3)—CH2—O)n, NH2, NHR, NR2, CH2—CH2—NH
R2 = [N—CO—(CH2)3], cyclic amines
R3 = $(CH_2)_n$—$CH_3$, —$(CF_2)_n$—$CF_3$, n = 0 to 10
R4 = (CH2)n—CH3, n = 1 to 4
R5 = $(CH_2)_n$—$CH_3$, n = 1 to 10
R6 = Phenyl, cyclopentadienyl, or mixture of R4 and R5.

By C1 to C8 is meant the monomer unit number 1-8 respectively from column C.

It is important that the polymers do not reduce the surface energy of wood too much. This will cause the wetting and adhesion of waterborne paints to be jeopardized; therefore the above specified polymers are particularly preferred. A typical application range of the block-polymer according to the invention is 1-30 kg/m$^3$, such as 2-20 kg/m$^3$, preferably 5-15 kg/m$^3$. The presently preferred amount is approximately 10 kg/m$^3$, as most polymers according to the invention will result in materials having the lowest amount of water retention as measured according to the present invention.

In the context of the present invention the term "application" should be understood as the amount of polymer retained in the porous matrix. The terms may be used interchangeably.

It should be noted that the optimal range depends on the polymer used, whether or not the polymer is a combination of two or more polymers, the wood species to be treated and the process conditions. The optimal application range in a given set-up is within the skill of the art.

In the context of the present invention the term wood susceptible to damage may also be defined as a refractory species. The term "refractory species" is a term well-known for a person skilled in the art as evidenced in an article by Anderson et al. ("*The effects of supercritical CO$_2$ on the bending properties of four refractory wood species*" Anderson et. al. 2000, *Forest Products Journal*, 50:85-93). In order to determine if a wood species is a refractory species, a suitable numbers of specimens thereof can be put under pressure using the carrier fluid in question and depressurised in a short time and subsequently the specimens are examined for damages. For example samples can be pressurized with carbon dioxide to 150 bars at 35° C. and depressurised in 30 min and subsequently examined for damages. If the number of damages observed after this treatment is above the selected limit the wood is of a refractory species. Examples of refractory species of wood according to the invention are: spruce, Western red cedar and Engelman Spruce.

In the context of the present invention the term the length above the critical length should mean the length over which specimens of a susceptible wood species (as defined above) damages occur.

The porous material may be any porous material, such as whole wood, wood products, such as chipboards, veneers, fiber boards; cellulose fibre containing products such as cardboard, paper, and even leather.

The fluid to be used in the present invention may be any suitable fluid, such as but not limited to carbon dioxide, $N_2O$, propane and ethylene. A particular preferred fluid is carbon dioxide. Carbon dioxide is a so-called green solvent. Carbon dioxide has a relatively low critical temperature (31.1° C.) is substantially non-toxic, is non-flammable, relatively inert and environmentally acceptable as compared to other solvents. Moreover, carbon dioxide is relatively inexpensive, and for the purpose of the present invention, the degree of purity is not critical (as compared to food grade), which makes it even less expensive.

Figure 2:
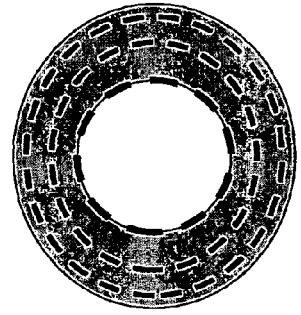
FIG. 2 schematic illustration of the effect of impregnating wood under supercritical conditions.
Figure 2:
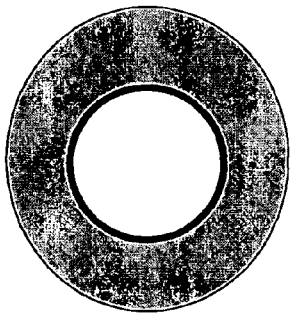

Supercritical carbon dioxide can dissolve certain hydrophobic polymers. Molecular weight and chemical composition of the polymers are critical parameters as far as solubility in supercritical carbon dioxide is concerned. Treating porous materials, such as wood, with a polymer dissolved in carbon dioxide results in an impregnation of the porous material where the polymer is absorbed or adsorbed within the porous matrix, e.g. within the wood fibre, and at the walls of voids. This is illustrated in FIG. 2 for wood.

The absorption of polymers from supercritical fluids, such as carbon dioxide onto porous materials, such as wood, is governed by the ratio of solubility in the gas-phase versus the absorption to the porous matrix. The absorption may therefore be seen as a chromatographic process. As for traditional chromatography one is able to manipulate the equilibrium between the mobile and solid phase; the same applies to wood impregnation. This means that one can change the solubility of the polymer by changing pressure and temperature in the gas-phase of the supercritical fluid, e.g. sc-$CO_2$; therefore, depositing the block-polymer onto the porous matrix can be made in a controlled way. For each specific choice of polymer and/or fluid and/or choice of porous material, e.g. wood species, a specific parameter must be found for optimising production on a commercial scale. For example the method described in WO 00/27601 may be employed or any other impregnation method used in the art. In general wood may be treated according to a method in which: a) a vessel is charged with wood to be treated; b) the vessel is pressurized using the carrier fluid until the treatment pressure is reached; c) a holding period where the pressure is essentially constant or the pressure changes at a low rate; and d) the vessel is depressurised to ambient temperature followed by removal of the treated wood. However, other known methods can equally be applied.

It is also contemplated that the method of the present invention can be combined with other treatments. Such other treatment may be an impregnation process where one or more active compounds are deposited in the wood. These active compounds may be biocides, fungicides, insecticides, colorants, fire retarding compounds, strength improving compounds etc. Moreover, the treatment may be an extraction process where particular compounds are extracted from the wood, such as resin, terpenes etc., or it may be toxic compounds that have to be removed from wood before disposal of the wood.

Figure 11A:
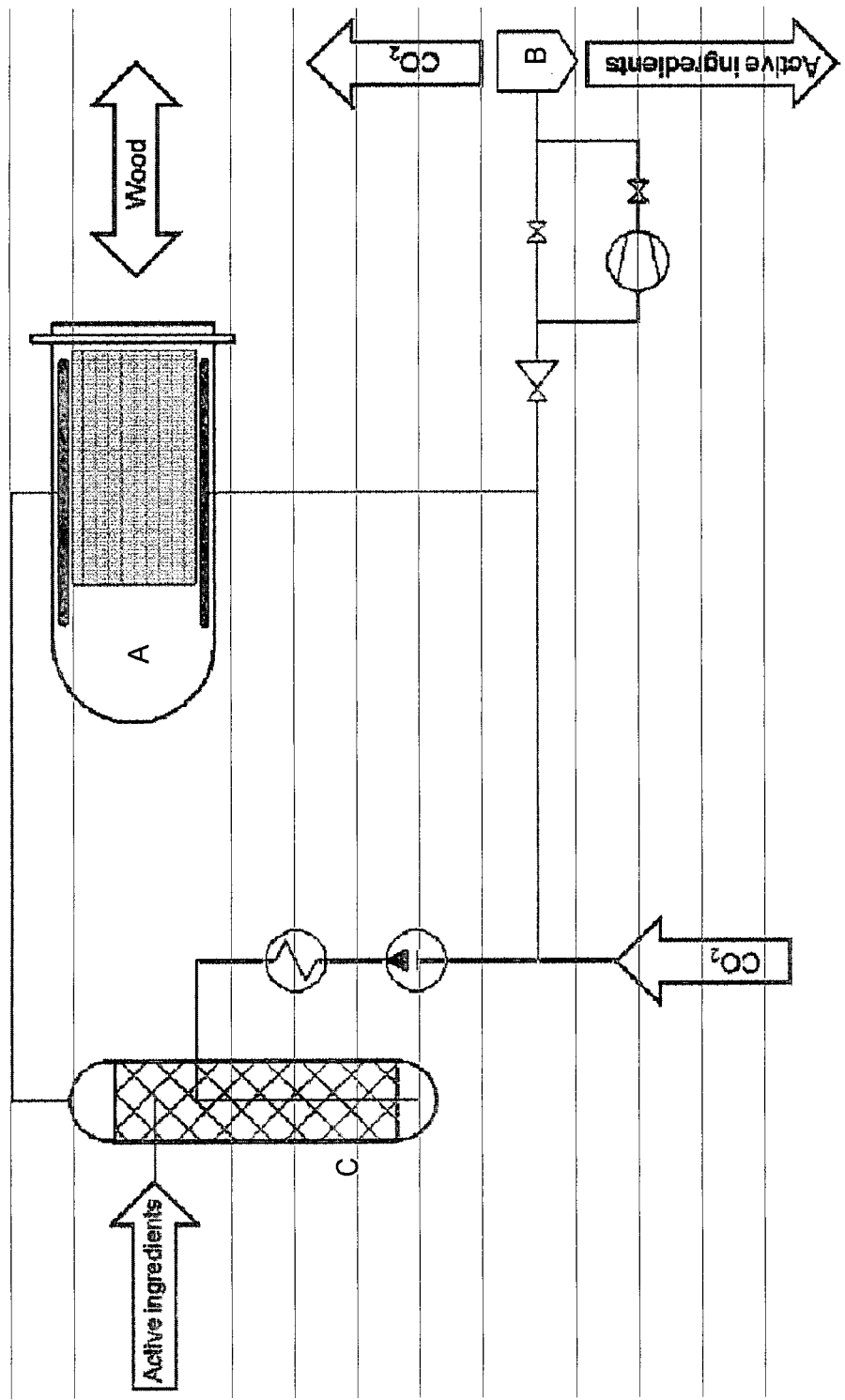
FIGS. 11a and b are process charts of an impregnation process where wood is treated according to the method of the invention.

Referring to FIGS. 11a and b treatment of wood according to the method of the invention will now be explained in more details.

Figure 11B:
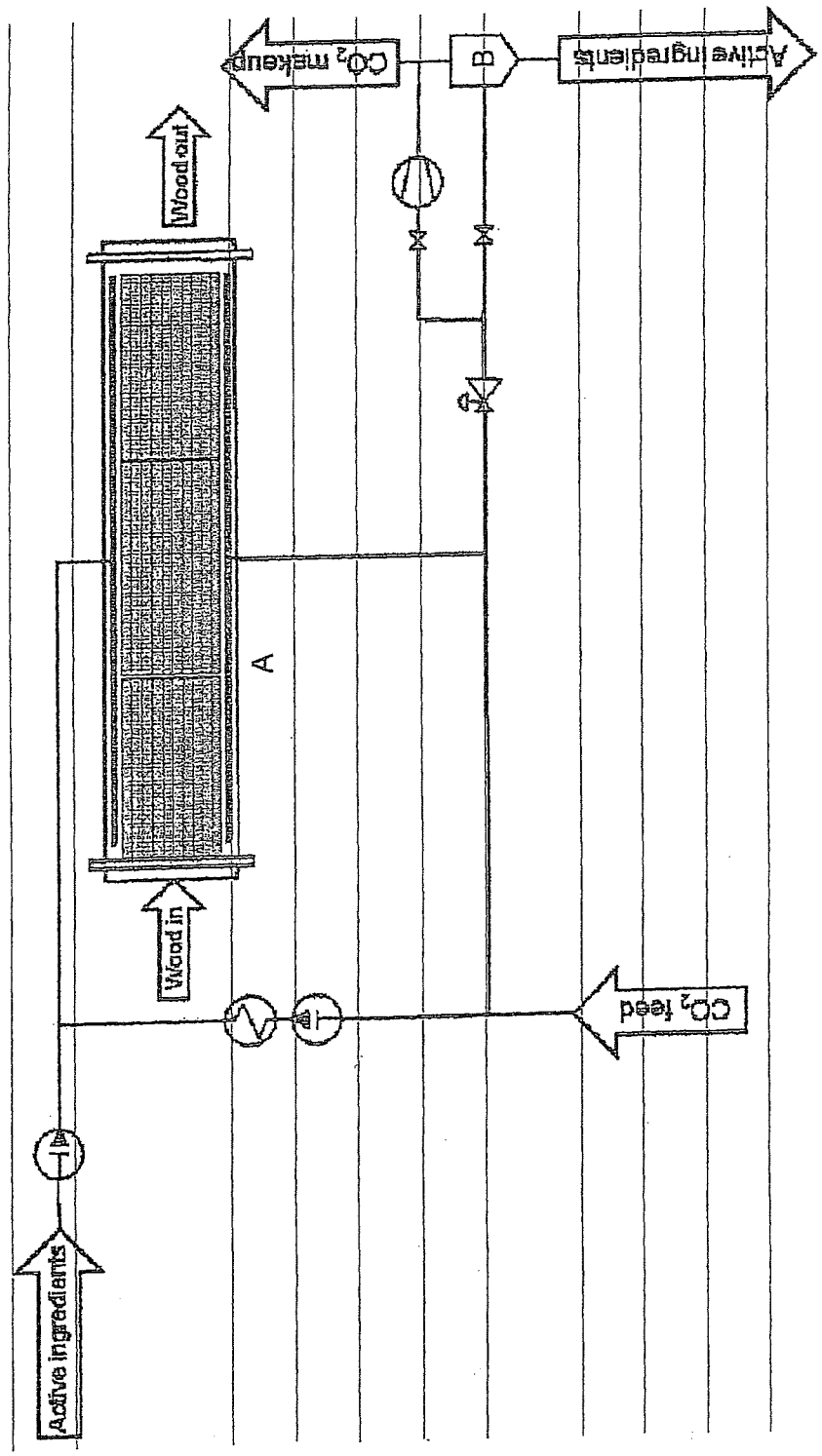

The method of the invention may on large scale be practiced in a process as depicted in either FIG. 11a or 11b.

The design is in a preferred embodiment of the present invention as outlined in FIG. 11a.

The dimensions of the treatment vessel (A) may have an internal diameter of 170 cm and a length of 660 cm or the same dimension as described above. The treatment vessel (A) will be designed to be a pressure tight treatment chamber which will have at one end an opening for introducing a wood substrate and withdrawing a treated wood substrate.

In the top section of the treatment vessel (A) an inlet for pressurized mixture of active ingredients and carbon dioxide is present. At the bottom of the treatment vessel (A) an outlet for extraction of mixture is present.

The active ingredients and carbon dioxide will be admixed in a mixer vessel (C). The active ingredients will preferably be supplied before addition of carbon dioxide, i.e. under atmospheric pressure. Carbon dioxide will be added to the mixer vessel until a pressure of 150 bars is reached. This will facilitate the solubilisation of active ingredients in the carbon dioxide. From the mixer vessel (C) the pressurized mixture will be supplied to the treatment vessel (A) through the inlet at the top section of the treatment vessel (A).

The extracted mixture from the treatment vessel (A) will be directed to a separator unit (B) for separation into carbon dioxide and active ingredients. The separated carbon dioxide will be re-circulated to the carbon dioxide to be supplied to the mixer vessel (C), and the separated active ingredients will be re-circulated to the stream of supplied active ingredients to the mixer vessel (C).

An advantage of the embodiment of FIG. 11a is that a pressure pump can be saved as the pressure increase will happen due to a continuous addition of carbon dioxide to the mixer vessel (C) until a pressure of 150 bars is reached, by which the carbon dioxide will reach supercritical conditions.

Referring now to FIG. 11b another design of an embodiment of the present invention is outlined.

The dimensions of the treatment vessel (A) may have an internal diameter of 170 cm and a length of 2500 cm. The treatment vessel (A) is designed to be a pressure tight treatment chamber which will have one end for introducing a wood substrate(s) and one end for extracting the treated wood substrate(s). Furthermore, the treatment vessel (A) contains an injection valve (not shown) in the top section for introducing a pressurized mixture of active ingredients and carbon dioxide (hereinafter referred to "the mixture") to the wood substrate. The injection valve will be able to spray the active ingredients into the carbon dioxide flow at any point during the treatment process but preferably during pressurization as this will facilitate the solubilization. The pressure of the mixture of active ingredients and carbon dioxide will ultimately be 150 bars which will ensure supercritical conditions when using carbon dioxide as the fluid.

At the bottom of the treatment vessel (A) an outlet for extracting the introduced pressurized mixture may be present.

In connection with the injection valve an injection system is present for supplying a pressurized mixture to the injection valve. Within the injection system a pump for pressurization will be connected for each of the streams of mixture of active ingredients and carbon dioxide, respectively. As the pressurized mixture can be sprayed at any point during the treatment process, the carbon dioxide may reach supercritical conditions before admixing with active ingredients and thereby the dead volume will be reduced and the consumed carbon dioxide reduced.

The extracted mixture from the treatment vessel (A) can be directed to a separator unit (B) for separation into carbon dioxide makeup and active ingredients. The carbon dioxide makeup will be re-circulated to the carbon dioxide feed stream to be re-used in the process. The separated active ingredient mixture will be re-circulated to the active ingredient mixture feed stream for further use in the process.

The length of the treatment vessel (A) will provide an increased possibility of arranging wood packages of different lengths in the treatment vessel (A), which also will contribute to a reduced dead volume.

In this embodiment there will be no need for a separate mixer vessel as the mixture of for example one or more polymers and optionally a catalyst, will be admixed within the injection system. The reduced dead volume and injection system will lead to advantages such as a higher filling rate, lower operational costs, and a higher overall efficiency.

The process described above has several technical and environmental benefits compared to traditional wood treatment processes. The wood will be impregnated to the core, it will be possible to impregnate heartwood and low permeability wood species, and the use of organic solvents and heavy metals are avoided without compromising the durability of the treated wood species.

The present invention will now be illustrated by way of the following non-limiting examples.

EXAMPLES

Example 1

Impregnation of Wood with Block-Polymers According to the Invention Dissolved in Carbon Dioxide Under Supercritical Conditions 1. Choice of Polymers.

The polymers were primarily chosen in respect of their solubility in supercritical carbon dioxide, water resistance, stability in the wood, functionality, price and availability.

2. Impregnation

Impregnation of small wood blocks was performed in a plant in which the cylinder for performing the treatment is app. 1 Liter. The dimension of the wood blocks to be tested was 15×25×50 mm and they were selected having a weight so that the weight distribution was minimized. Each wood block was labeled before initiating the experiment. The wood blocks normally weigh 7.5-10.5 g and for each experiment six pieces of sapwood of pine and six pieces of spruce were used.

When impregnating with block-polymer approximately 2 g polymer is to be used per 100 g of wood. The density of the wood is approximately 0.5 g/cm$^3$, corresponding to an approximate dosage of 10 kg polymer/m$^3$ wood. The polymer was dripped/sprinkled onto glass wool placed in a frame at the bottom of the cylinder. The glass wool was weighed before and after the method, and the degree of solubility of the block-polymer was hereinafter be calculated.

The wood blocks were positioned upright in the cylinder over the frame holding the glass wool and the cylinder was closed with sintered metal screw caps and placed in the outer cylinder of the pilot plant.

The process is based on an existing process at the plant facilities of the inventor, and is thus, without the wish to be bound by this, adapted thereto for practical reasons. The temperature was adjusted to 45-50° C. and the pressure was increased to a maximum of 150 atm. When the set pressure was attained, the gas in the cylinder was circulated by an external pump in order for the block-polymer to be dissolved therein fast.

In the presently performed screenings the process time was set to 24 hours, however the time may vary with the type of plant, polymer and wood used and other factors. It is to be expected that the processing time may be substantially reduced when a particular set up has been optimized.

The process was concluded by reducing the pressure to atmospheric pressure over 10-15 minutes.

3. Measurement of Water Resistance

The wood blocks impregnated as outlined above were allowed to condition at least 24 hours. Hereby it is ensured that no remnants of carbon dioxide are present in the piece of wood and that the moisture content is stable.

The wood blocks were weighed again before the wetting experiment was started. This point of time is denoted $T_0$. The wood blocks were then immersed in water at 20° C. and the weight after excess water was removed, e.g. by padding the block, was registered after 5, 10, 20 40 and 80 minutes of immersion in the water.

The result is calculated as the percentage weight gain as compared to the weight at $T_0$. From the results, a soaking curve was prepared as the mean value of the six specimens used for each wood species and experiment. By preparing the soaking curve a comparison with soaking of untreated wood was made.

Figure 3:
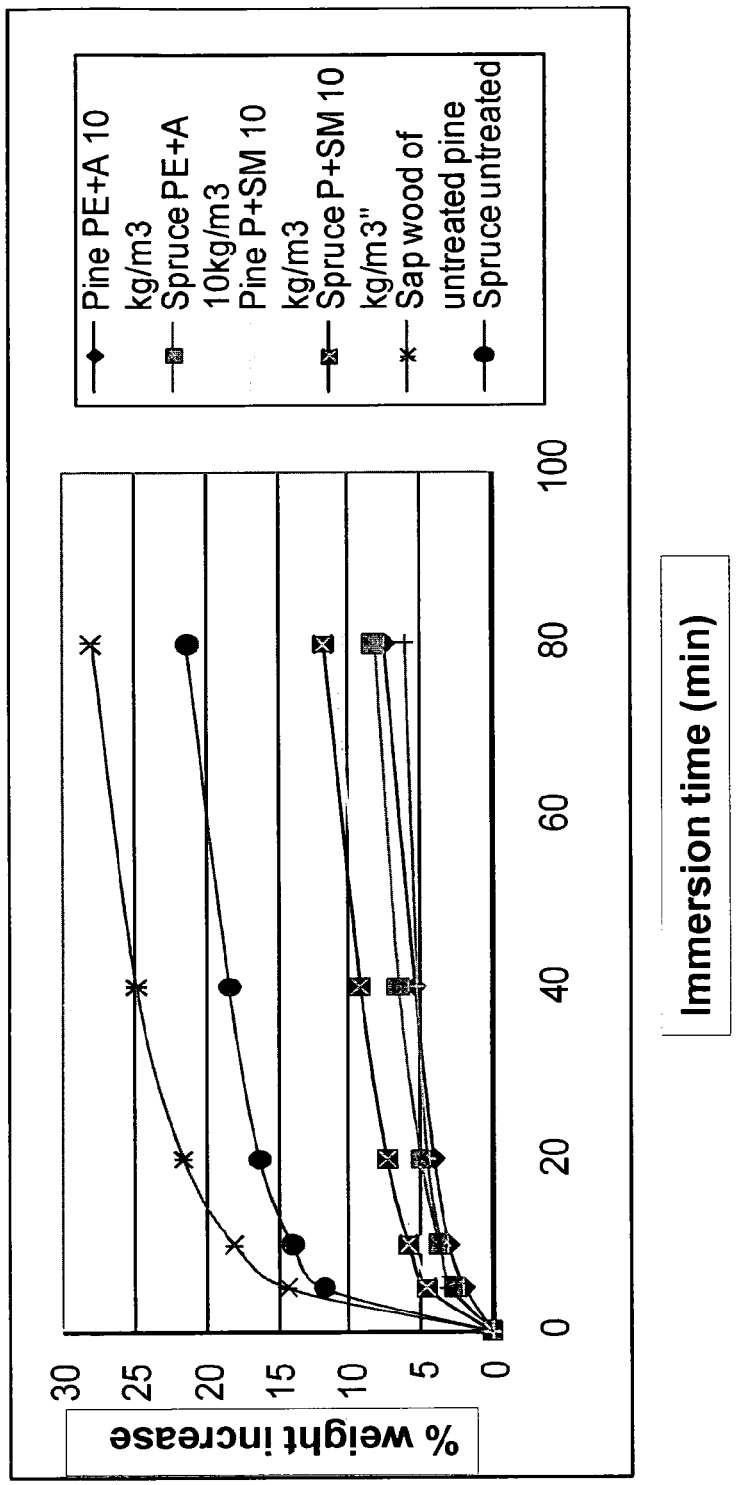
FIGS. 3-5 each represents a graph showing the percentage weight increase of different wood blocks after immersion in water for 80 minutes at 20° C. using different polymers according to the invention (the figures are described in details in example 1).
Figure 4:
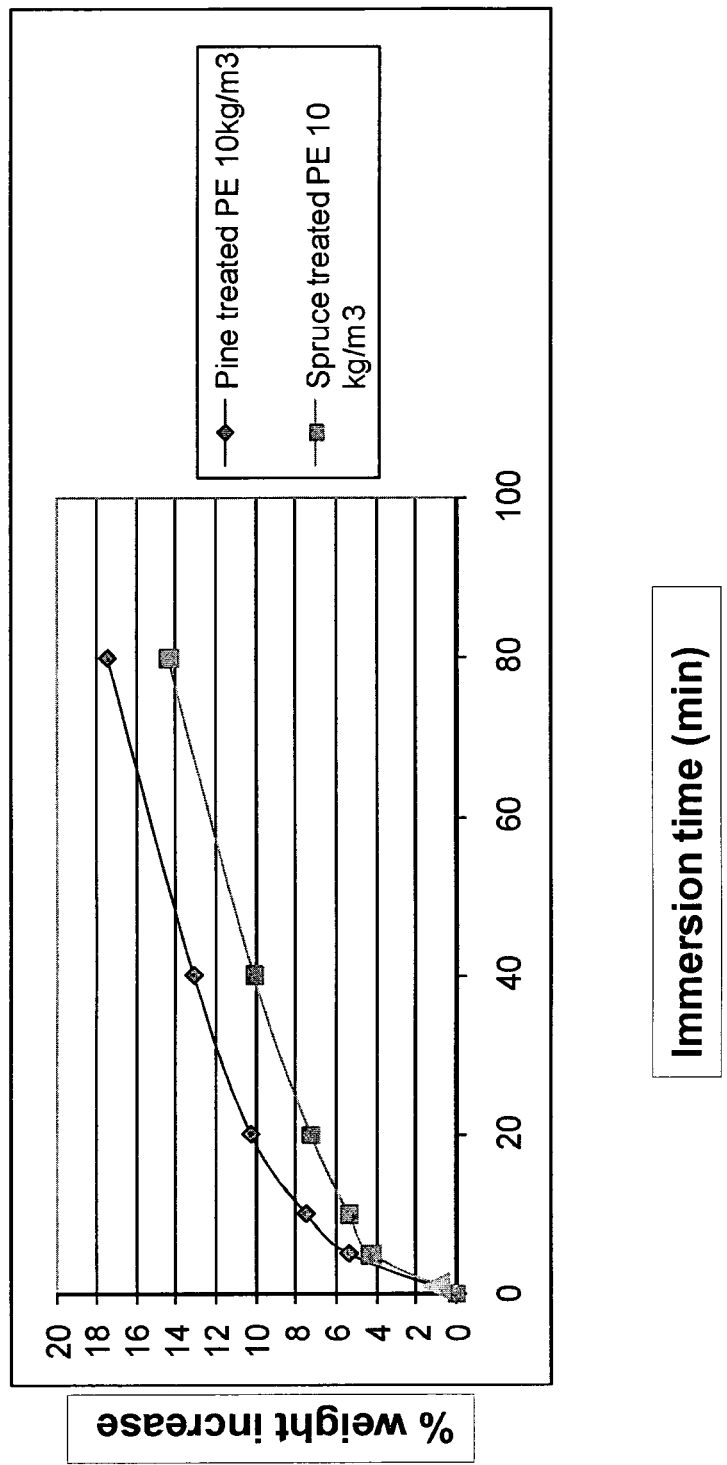
Figure 5:
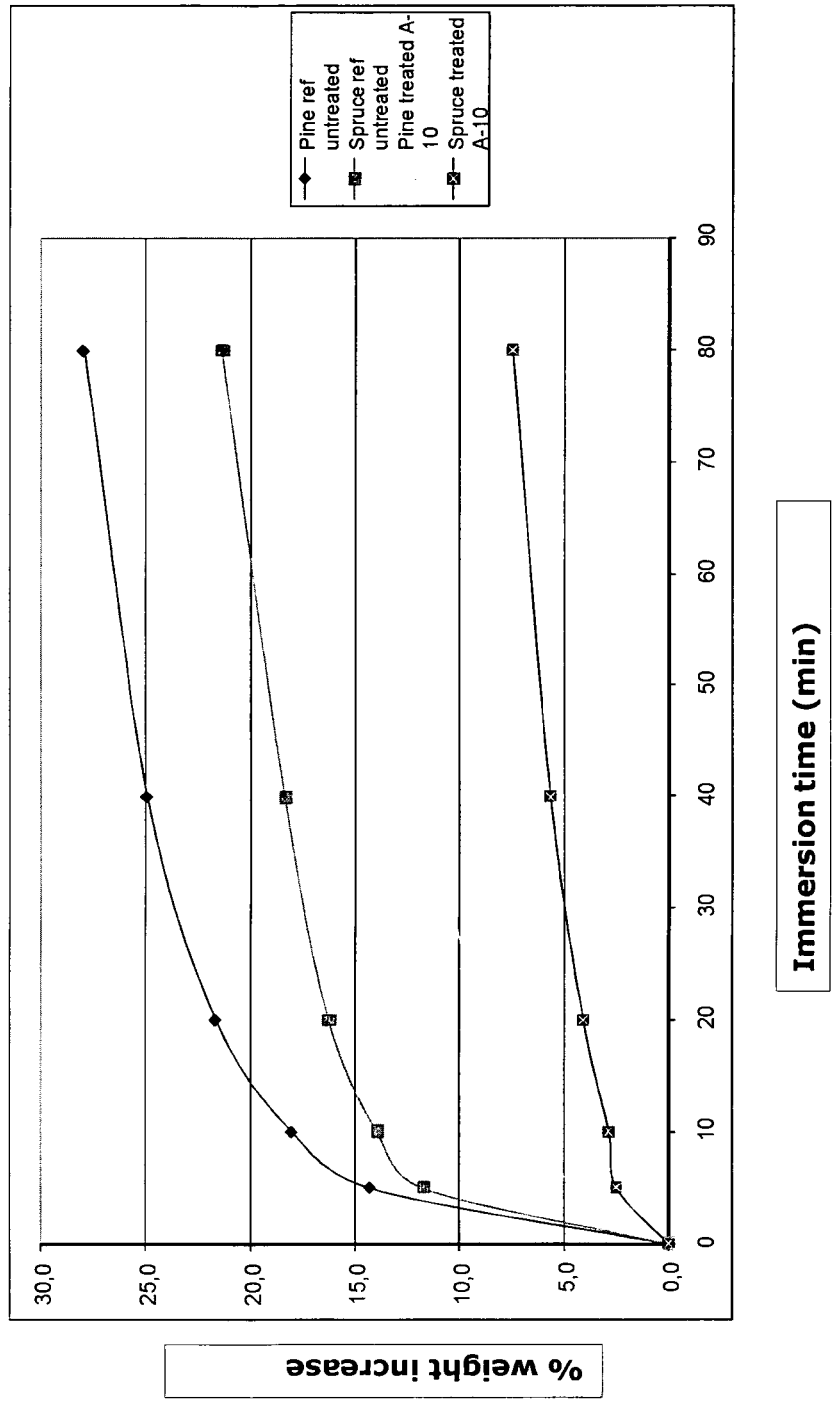
Figure 6:
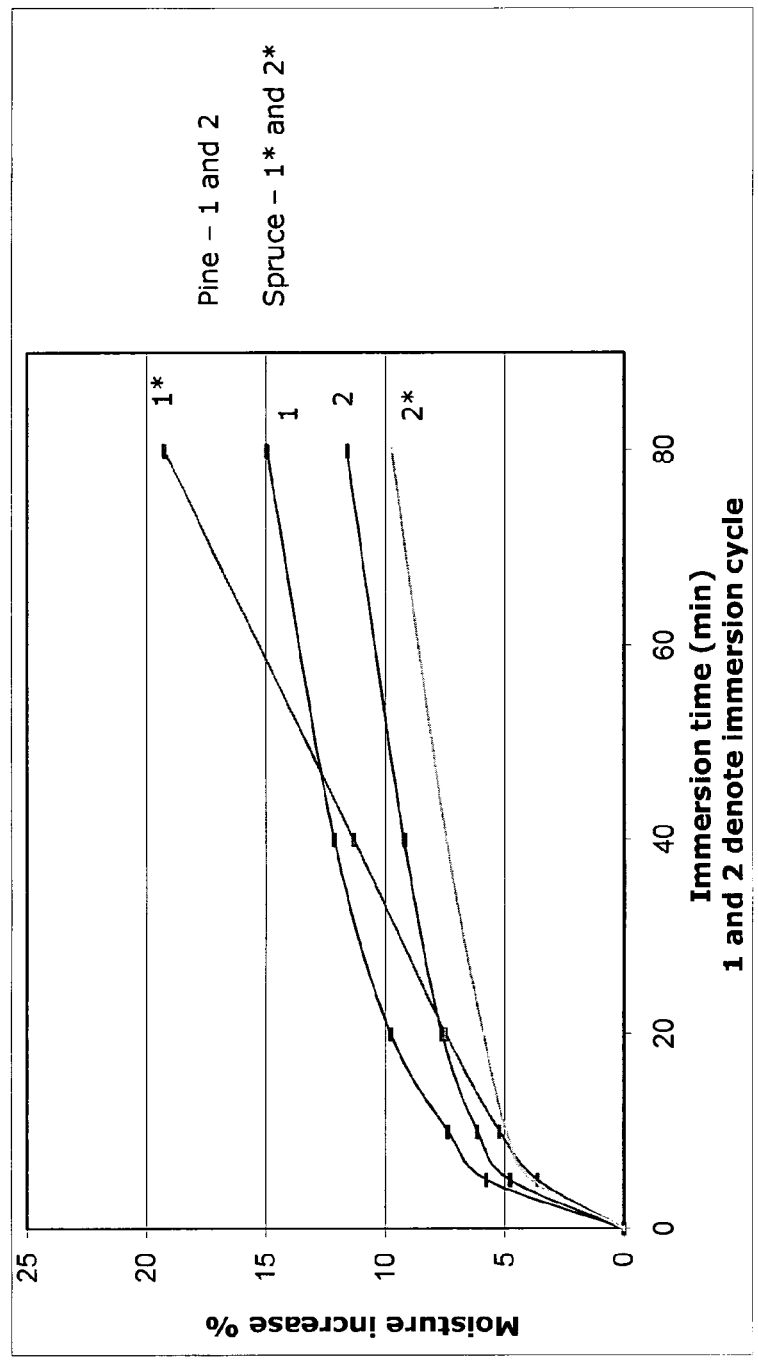
FIGS. 6 and 7 each represents a graph showing the percentage weight increase of different wood blocks after 1 and 2 immersions and 1, 2 and 3 immersions, respectively, in water for 80 minutes at 20° C. using reactive polymers and catalyst according to the invention (more details in example 3)
Figure 7:
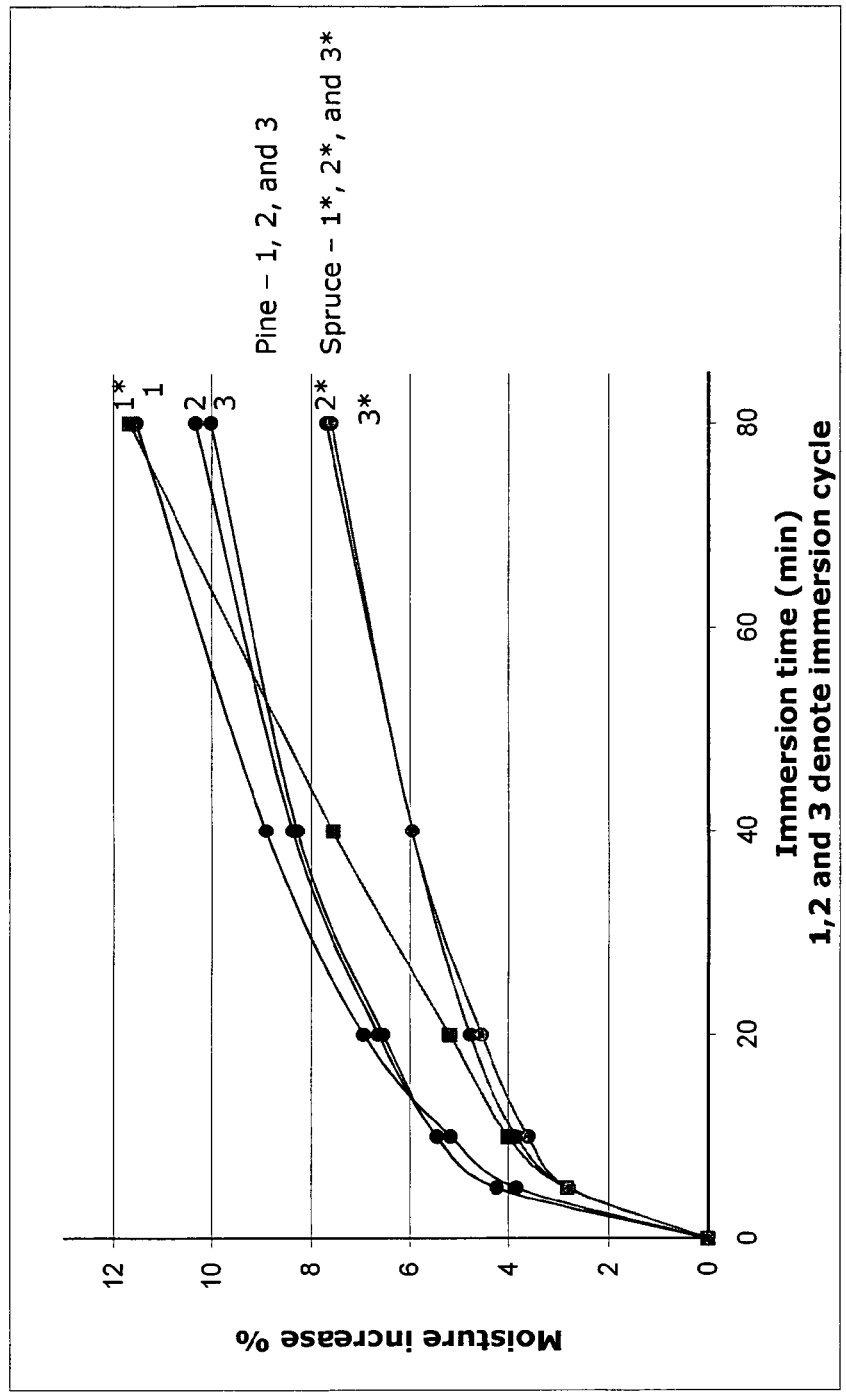

Wood blocks of untreated sapwood of pine with the same dimension as indicated above, will on a general basis take up 28% water op, whereas corresponding wood block with an optimal polymer treatment would take up approximately 10% water in respect of the total weight of the block. Specific results obtained by performing the experiment as just outlined are given are shown in the graph of FIGS. 3-5.

From the results it was evident that the soaking was reduced by 60-75% as compared to untreated pieces of sapwood of pine.

In the specific experiments performed, the effect of the polymer treatment of wood blocks in supercritical carbon dioxide (sc-$CO_2$) was monitored by immersion of the treated wood blocks (15×25×50 mm) in water. The absorption of water was measured by weighing the blocks as a function of immersion time.

Untreated wood blocks of pine sapwood and heartwood as well as spruce were used as reference material as well as chemically modified wood. Absorption curves for treatments are shown in FIGS. 3 to 5.

The result has been summarised in table 1 below where the weight increase after 80 minutes immersion in water in small blocks of pine sap wood was calculated. An immersion time of 80 minutes resulted in an increase of moisture of 28% in untreated pine sapwood with an initial moisture content around 10%. The moisture after water immersion is therefore well above the fibre saturation point which is at 28-30%.

TABLE 2

Weight gain after water immersion of pine sapwood blocks (15 × 25 × 50 mm) treated with different non-reactive polymers and mixtures of polymers.

| Test system | Polymer type | Approximately (max) retention of polymer kg/m$^3$ | % Weight gain after 80 min immersion in water at 20° C. |
|---|---|---|---|
| 1 | No treatment (pine) | — | 28 |
| 2 | No treatment (pine heart wood) | — | 6.3 |
| 3 | Perfluoropolyether terminal modified with alkylamid | 10 | 14.2 |
| 4 | Perfluoropolyether with terminal polyethylene oxide groups | 10 | 14.1 |
| 5 | Polypropylene ether with terminal polyethylene oxide groups | 10 | 17.4 |
| 6 | Polyether modified siloxane I | 10 | 10.3 |
| 7 | Polyether modified siloxane II | 10 | 12.9 |
| 8 | 1:1 mixture of 3 and 5 | 10 | 7.5 |
| 9 | 1:1 mixture of 3 and 5 | 5 | 9.5 |
| 10 | 1:1 mixture of 4 and 5 | 10 | 13.7 |
| 11 | 1:1 mixture of 5 and 6 | 10 | 11.2 |
| 12 | 1:1 mixture of 5 and 7 | 10 | 10.7 |
| 13 | 1:2 mixture of 5 and 6 | 10 | 19.9 |
| 14 | 3:1 mixture of 5 and 7 | 10 | 15.6 |

In this context Polyether modified siloxane I is a polyether siloxane with more than three siloxane units in the hydrophobic backbone and polyether modified siloxane II is a polyether siloxane with three units only (trisiloxane).

The mixing of block-polymers with different polymeric structure gave better water resistance than when using either of the polymers alone (FIG. 3 versus FIGS. 4 and 5, as is also seen from table 2). This is particularly valid for sapwood of pine which is more water sensitive than spruce wood.

It is also important to observe the effect of using different ratios of mixed polymers. The effect is dramatically influenced by changing the ratio, and an optimal mixing ratio is likely to exist for each pair of polymers. (See table 2 above, test number 11 versus 12 and test number 13 versus 14). In particular it seems that a 1:1 ratio gives the best result. It is quite surprising when for example comparing test numbers 5, 6, (the block-polymers individually) and 11, 13 (the same block-polymers in a 1:1 and 1:2 ratio respectively). It is clear that alone, test 6 shows that the siloxane polymer is more efficient that the polypropylene block-polymer (5), however, when mixed, a bias towards the siloxane polymer results in an inferior result (13) compared to the 1:1 test (11). This is much unexpected.

Example 2

Significance of Application Amount in Pine Wood

Impregnation of wood blocks was performed in an identical manner as described above, but with varying application weights.

TABLE 3

Weight gain after water immersion of pine sapwood blocks (15 * 25 * 50 mm) treated with different polymers and mixtures of polymers in different amounts.

| Test system | Polymer type | Approximately (max) retention of polymer kg/m3 | % Weight gain after 80 min immersion in water at 20° C. |
|---|---|---|---|
| 1 | No treatment (pine) | — | 28 |
| 2 | Perfluoropolyether terminal modified with alkylamid | 10 | 14.2 |
| 3 | Polypropylene ether with terminal polyethylene oxide groups | 10 | 17.4 |
| 4 | Polyether modified siloxane I | 10 | 10.3 |
| 5 | 1:1 mixture of 2 and 3 | 5 | 9.5 |
| 6 | 1:1 mixture of 2 and 3 | 10 | 7.5 |
| 7 | 3+ catalyst TPT*) | 5 | 20.2 |
| 8 | 3+ catalyst TPT*) | 15 | 24.4 |
| 9 | 3+ catalyst IAM*) | 20 | 11.2 |
| 10 | 1:1 mixture of 4 and 5 | 5 | 15.4 |
| 11 | 1:1 mixture of 4 and 5 | 10 | 11.2 |

*)10% (w/w) Tyzor ® IAM and propoxy titanate (Tyzor ® TPT), respectively, from DuPont based on polymer.

Tyzor® TPT is a tetra isopropyltitanate having the formula $Ti(O-i-C_3H_7)_4$ and Tyzor® IAM is a alkoxy titanium phosphate complex of the general formula:

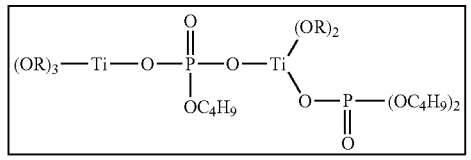

where the $(OR)_{2/3}$ groups are the leaving groups. Both are available from DuPont.

The purpose of adding a catalyst was to fix the block polymer onto wood by means of covalent bonding using e.g. a hydroxyl(OH)— active additive. However, it did not seem to have a significant impact in test numbers 7 and 8, while there was a significant improvement in test number 9. This effect was however most pronounced after 1 immersion. The effect may in some instances decrease over time as the bonds that are formed, are less stable covalent bonds that are believed to be formed with the metal of the catalyst.

Thus, it can be concluded that any reaction that will take place occurs relatively fast for this system where the polymer is non-reactive, i.e. contrary to the so-called reactive polymers, the effect is not improving with several immersions but is stabilized after one immersion (results not shown).

As can be seen from the table an application rate of 10 kg/m³ gives a better result than applying 5 kg/m³ (see for example test numbers 5 and 6, and 10 and 11 respectively). This in itself may not seem surprising.

However, when looking at test numbers 7 and 8 an increase from 5 to 15 kg/m³ does not result in a reduced water uptake, which might otherwise be expected, i.e. that applying more polymer will result in a better result. This showed not to be the case. This is surprising and suggests that at some point applying more polymer will not make the resulting wood less water resistant. It is thus to be expected that the optimum application rate of polymer is in the range 5-15 kg/m³, such as 7-12 kg/m³ and particularly 10 kg/m³.

Example 3

Impregnation of Wood with Reactive Siloxane Block-Polymers of the Invention

Wood was treated as described above under example 1. Unless otherwise stated all polymers were mixed with Tyzor® IAM catalyst (obtained from DuPont chemical Solutions Enterprise). The amount of catalyst added were 10% (w/w) of the polymer used.

The polymer and catalyst were mixed immediately before being applied to the wood block upon solubilization in carbon dioxide.

Wood blocks were treated with telechelic siloxanes with an epoxide functional group of the general formula Xa:

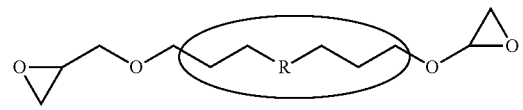

where the hydrophobic segment has the formula:

Hydrophobic segment

$R=-Si(CH_3)_2O[Si-(CH_3)_2-O]n-Si(CH_3)_2-$

TABLE 4

Weight gain after water immersion of blocks (15 * 25 * 50 mm) treated with different polymers of the formula Xa

| | | | | % Weight gain after 80 min immersion in water at 20° C. | |
|---|---|---|---|---|---|
| Test sample | n | Mw | CO$_2$-solubility | Pine sapwood | Spruce wood |
| W-5443 | 5 | 732 | 70 | 12.0 | 9.4 |
| W-5468 | 10 | 1100 | 96 | 9.8 | 7.3 |
| W-5443 | 5 | 732 | 70 | 15.7** | 11.5** |
| W-5468 | 10 | 1100 | 96 | 21.5** | 9.3** |
| W-5794-4 | 42 | 3470 | 82 | 16.2** | 16.2** |
| W-5794-3 | 112 | 8650 | 83 | 18.1** | 18.1** |

**treatment without catalyst.

The CO$_2$-solubility is the percentage (w/w) of polymer which is retained in the glass wool as compared to applied polymer.

From the table it can be seen that treatment with the polymers having a medium sized hydrophobic block (i.e. n=5-50, specifically 5, and 42) in most cases gave the best results. It is to be expected that the effect using the polymers W-5794-4, W-5794-3 is improved if mixed with catalyst, as can be seen is the case for the smaller polymers (W-5443 and W5468).

In another test, telechelic block polymers with a carbonate functional group were tested having the general formula XI:

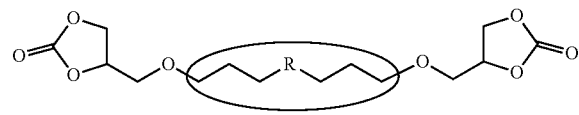

wherein the hydrophobic segment has the general formula:

Hydrophobic segment $R=-Si(CH_3)_2O[Si-(CH_3)_2-O]n-Si(CH_3)_2-$

TABLE 5

Weight gain after water immersion of blocks (15 * 25 * 50 mm) treated with different polymers of the formula XI

| Test sample | n | Mw | $CO_2$-solubility | % Weight gain after 80 min immersion in water at 20° C. | |
|---|---|---|---|---|---|
| | | | | Pine sapwood | Spruce wood |
| GEGH 1384 | 10 | ~1200 | 87.1 | 12.3 | 9.2 |
| W-5794-2 | 21 | ~2000 | 92.2 | 13.7 | 9.5 |
| W-5794-1 | 54 | ~4450 | 67.5 | 16.4 | 9.8 |

Again the effect of treating with a polymer having a reactive group capable of forming a bond with the hydroxyl groups of the wood structure significantly reduces the moisture uptake of the wood blocks.

It is believed that any siloxane polymer having a functional group, and having a medium sized hydrophobic segment—in this context considered n or x+y=1-50 will result in such improved effects.

In still another test, wood blocks were treated with siloxanes with non-terminal epoxide functional groups of the general formula Xb:

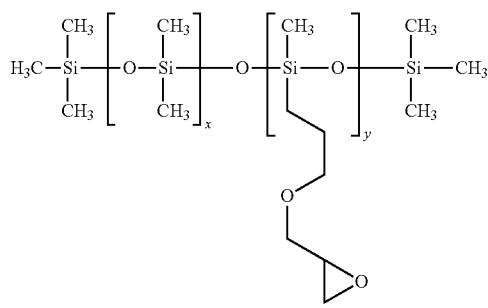

TABLE 6 test sample with non-terminal reactive polymer of the general formula Xb

| Test number | x | y | $CO_2$-solubility |
|---|---|---|---|
| Waro 329 | 0 | 1 | 79 |
| Others | 1-40* | 1-40* | — |

*with the proviso that x + y ≤ 50.

Figure 8:
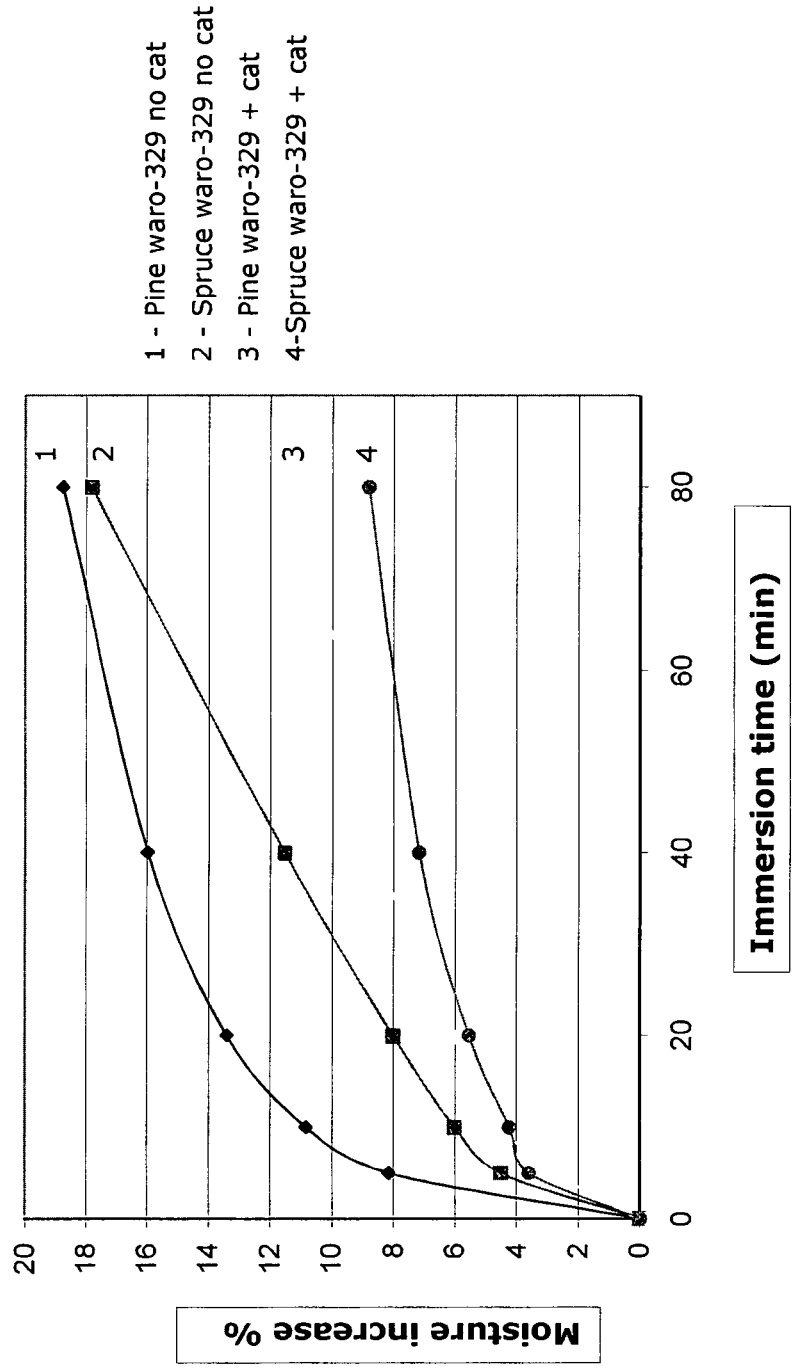
FIG. 8 shows the water absorption of pine and spruce when treated with Waro-329 with and without a catalyst Tyzor® IAM (more details in example 3)

In FIG. 8 the effect of treating with Waro 329 with and without catalyst is shown. It is clear that the non-terminal reactive polymer seems less effective than the terminal reactive polymer without the use of a catalyst. But when a catalyst is added the effect is significantly improved so that the moisture uptake is reduced from around 18 percent without catalyst to 9-11 percent with the catalyst. The effect of using non-terminal reactive polymers is thus similar to or better than the effect seen for the terminal reactive groups when using a catalyst.

Example 4

Durability of Water Resistance

Yet another important aspect when measuring water resistance is the stability of the treatment. The stability can be measured by performing a number of immersion cycles in which the wood blocks are dried to regain the starting weight (i.e. the weight at $T_0$) after each immersion. A normal course will reveal that the water resistance will decrease for each soaking cycle. It surprisingly turned out that when performing this test on wood samples treated according to the present invention the polymers used for treatment showed a rather flat curve in respect of the decrease after several immersions.

Figure 9:
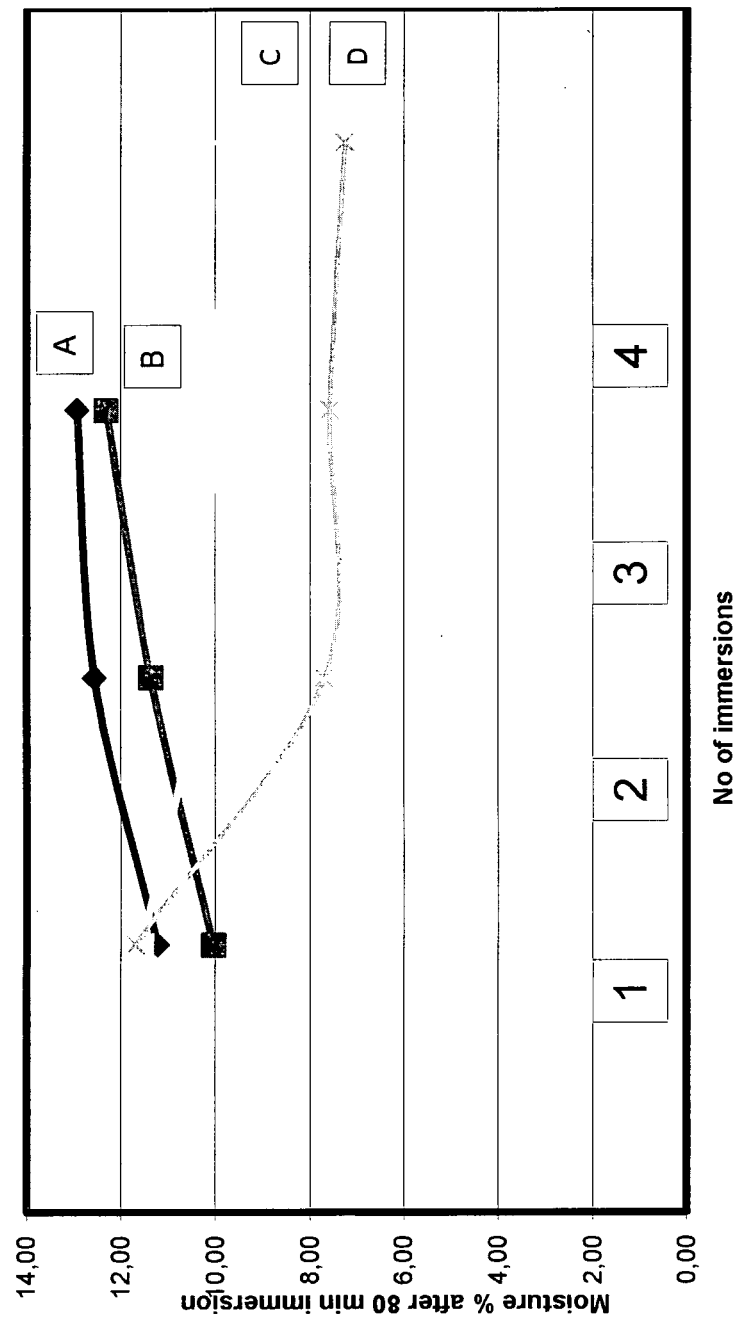
FIG. 9 shows the water absorption after several cycles of water immersion for 80 minutes. In the graph A and B refer to pine and spruce, respectively, treated with a 1:1 mixture of non-reactive polymers 5 and 7 of table 2. C and D refer to pine and spruce, respectively, treated with the reactive polymer W-5468 having a terminal epoxide functional group of table 4 mixed with the catalyst Tyzor IAM (more details in example 4)

In FIG. 9 a cycle of three and four immersions, respectively, were tested for test samples (spruce and pine) treated with a 1:1 mixture of 5 and 7 (i.e. corresponding to test number 12 in table 2) the application rate was 10 kg/m³. After three cycles the moisture content uptake stabilized at approximately 12.5%.

The same repeated immersions were performed with the terminal reactive epoxide trisiloxanes of table 4 treated with the additive. For these test samples the water uptake surprisingly decreased. Without the wish to be bound by any theory it is believed that the improved effect is due to the additional reactions promoted by water reaction being promoted by the repeated contacting with water.

Thus, it has been shown that both wood blocks treated with non-reactive and reactive block polymers show a stabilized water uptake when treated by repeating immersion cycles. The reactive polymers even show a reduced water uptake when increasing the number of immersions. Thus, it is to be expected that materials treated with the reactive polymers of the invention are even more durable, when the material to be treated, such as wood, contains —OH groups.

Example 5

Water Repellency of Treated Wood Blocks

In order to test the wood blocks treated according to the present invention a comparable test was performed where three different wood blocks were compared. One treated by traditional pressure impregnation (Cu-based), one untreated and one wood block treated according to the present invention. Water repellency is proportional to the contact angle formed by a water droplet placed on the wood surface. A more practical approach to measure water repellency can be done by measuring the time to complete wetting or adsorption of the water droplet. This of cause is only valid for similar types of wood having comparable density and structure.

Figure 10:
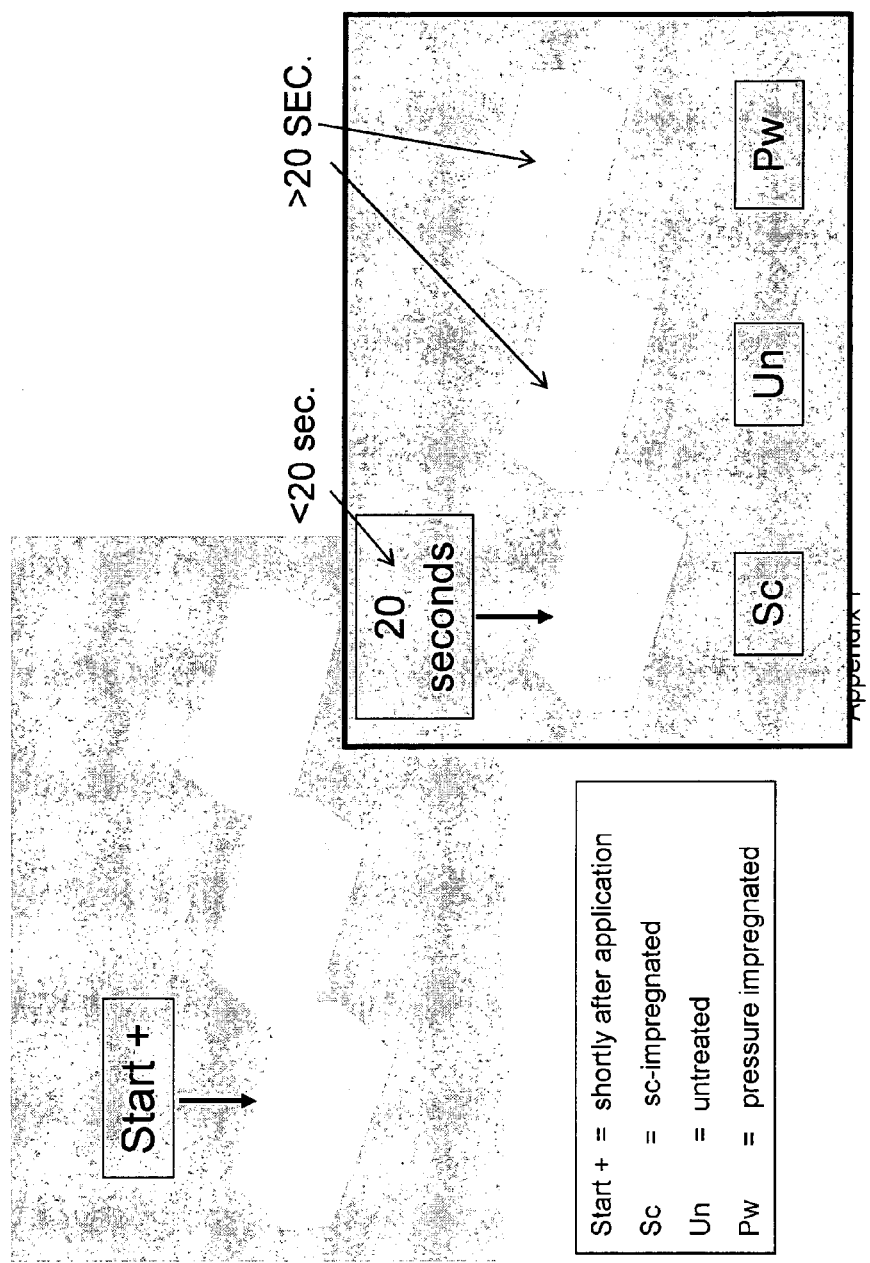
FIG. 10 is an illustration of water repellence of wood treated according to the present invention compared to untreated, and Cu impregnated wood (more details in example 5).

A picture of wood blocks with a water droplet placed on the surface is illustrated in FIG. 10. The impregnated wood blocks prepared by the method according to the invention showed a very short wetting time (<20 sec) whereas untreated and pressure treated wood blocks showed a much higher wetting time (>>20 sec). Without the wish to bound by any theory it is believed that one reason for the observed short wetting time for sc-impregnated wood according to the invention is that some of the block polymers are surface active.

The invention claimed is:

1. A method for providing water resistance to a porous material comprising the steps of:
   a1) applying at least two polymers to the porous material; or
   a2) mixing at least two polymers with a first fluid; and
   b) if step a1) is performed, subsequently treating the porous material with a first fluid under supercritical conditions, and if step a2) is performed, subsequently treating the porous material with the first fluid having the at least two polymers under supercritical conditions;
   wherein the at least two polymers are a first block-polymer and a second block-polymer comprising at least one hydrophobic block and at least one hydrophilic block; and,
   wherein the first block-polymer and the second block-polymer are independently chosen and are different from each other.

2. The method according to claim 1, wherein the at least two block-polymers have a structure selected from:
   a triblock copolymer of the general formula (i)

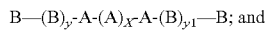
   B—(B)$_y$-A-(A)$_x$-A-(B)$_{y1}$—B; and a grafted copolymer of the general formula (ii)

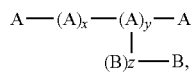

wherein A is a hydrophobic block, B is a hydrophilic block and, x, y, y$_1$ and z independently are 0 or an integer.

3. The method according to claim 2, wherein x is 0-40, y is 1-20, y$_1$ is 1-20 and z is 1-20 and x+y+(y$_1$ or z)≤50.

4. The method according to claim 2, wherein the hydrophilic block B comprises at least one functional group capable of forming a covalent bond with a hydroxy group.

5. The method according to claim 2, wherein the hydrophilic block B comprises at least one functional group capable of forming a covalent bond with a hydroxy group and wherein the functional group is selected from an epoxide, carbonate, anhydride and ester group.

6. The method according to claim 1, wherein the polymers are mixed with a catalyst that promotes ring opening reactions and transesterifications.

7. The method according to claim 1, wherein the ratio between the first and the second polymer is 3:1 to 1:3.

8. The method according to claim 1, wherein the hydrophobic block of the at least two block-polymers are made of a monomer unit selected from the group consisting of: Polypropylene ether, Polypropylene ether having the formula —CH$_2$—CH(CH$_3$)—O—, Polyalkyl ether having the formula —CH$_2$—CH(R$_3$)—O—, wherein R$_3$ is (CH$_2$)$_n$—CH$_3$ or —(CF$_2$)$_n$—CF$_3$, and n=0 to 10, polylactate having the formula —O—CH(CH$_3$)—CO—, polycaprolactone having the formula —O—(CH$_2$)$_5$—CO—, polyvinylalkylate having the formula —CH$_2$—CH(OCO—R$_4$)—, wherein R$_4$ is (CH$_2$)n-CH$_3$, and n=1 to 10, siloxane-di-methyl having the formula —Si(CH$_3$)$_2$—O—, siloxane-di-alkyl having the formula —Si(R$_5$)$_2$—O— wherein R$_5$ is (CH$_2$)$_n$—CH$_3$ and n=1 to 10, siloxane-di-aryl having the formula —Si(R$_6$)$_2$—O— wherein R$_6$ is Phenyl, cyclopentadienyl, or a mixture of R$_5$ and R$_6$ having the same meaning as above, perfluoroethylene ether having the formula —CF$_2$—CF$_2$—O—, perfluoropropylene ether having the formula —CF$_2$—CF(CF$_3$)—O—, perfluoroethylene having the formula —CF$_2$—CF$_2$—, and poly(ethercarbonate) having the formula —O—CH$_2$CH(CH$_3$)—OCO—.

9. The method according to claim 1, wherein the hydrophilic block of the at least two block-polymers are made of a monomer unit selected from the group consisting of: polyethylene ether having the formula —CH$_2$—CH$_2$—O—, polyethylene amine having the formula —CH$_2$—CH$_2$—NH—, polyvinylacetate having the formula —CH$_2$—CH(OCOCH$_3$)—, polyvinylalcohol having the formula —CH$_2$—CH(OH)—, polyacrylate having the formula —CH$_2$—CH$_2$—CO—R$_1$, wherein R$_1$ is selected from OH, CH$_2$—CH$_2$—OH, (CH$_2$—CH$_2$—O)$_n$, (CH(CH$_3$)—CH$_2$—O)$_n$, NH$_2$, NHR$_2$, NR$_2$, wherein R$_2$ has the meaning below, CH$_2$—CH$_2$—NH and n=1 to 10, polyvinyl cyclic amide or amine having the formula —CH$_2$—CH$_2$—R$_2$, wherein R$_2$ is N—CO—(CH$_2$)$_3$, or a cyclic amine; and mixtures of at least two of members of the group.

10. The method according to claim 9, wherein the hydrophilic monomer unit is a pair of monomers selected from the group consisting of: (i) the polyethylene ether and polypropylene ether, or (ii) polyvinyl acetate and polyvinylalcohol.

11. The method according to claim 1, wherein the porous material is a wood substrate.

12. The method according to claim 11, wherein the wood substrate is a conifer wood species.

13. The method according to claim 1, wherein the fluid is carbon dioxide.

14. The method according to claim 1, further being directed at performing an impregnating and/or extracting treatment, wherein the porous material is a resin-containing wood substrate and wherein the treatment step (b) of claim 1 comprises the steps of:
   i) introducing the wood substrate into a pressure tight treatment chamber,
   ii) introducing a stream comprising said fluid into the chamber and adjusting the pressure and temperature therein to ensure the fluid being present in supercritical state,
   iii) maintaining contact between the wood substrate and the fluid in supercritical state for a time period,
   iv) reducing the pressure, and
   v) withdrawing the treated wood substrate from the chamber.

15. The method according to claim 14, wherein the wood substrate is a refractory piece having a length above a critical length and wherein the fluid is in non-liquid state throughout the entire treatment.

16. The method according to claim 1, wherein the ratio between the first and the second polymer is substantially 1:1.

17. A method for providing water resistance to a porous material comprising the steps of:
   a) applying at least two polymers to the porous material; and,
   b) treating the porous material with a fluid under supercritical conditions;
   wherein the at least two polymers are a first block-polymer and a second block-polymer comprising at least one hydrophobic block and at least one hydrophilic block; and,
   wherein the first block-polymer and the second block-polymer are independently chosen and are different from each other.

18. A method for providing water resistance to a porous material comprising the steps of:
   a) mixing at least two polymers with a fluid; and,
   b) treating the porous material with the fluid including the at least two polymers under supercritical conditions;
   wherein the at least two polymers are a first block-polymer and a second block-polymer comprising at least one hydrophobic block and at least one hydrophilic block; and,
   wherein the first block-polymer and the second block-polymer are independently chosen and are different from each other.

* * * * *